US012516185B2

(12) United States Patent
Saba et al.

(10) Patent No.: US 12,516,185 B2
(45) Date of Patent: Jan. 6, 2026

(54) POLYMERIC COMPOSITIONS

(71) Applicant: Dow Global Technologies LLC, Midland, MI (US)

(72) Inventors: Stacey A. Saba, Eagleville, PA (US); Paul J. Brigandi, Schwenksville, PA (US); Mohamed Esseghir, Lawrenceville, NJ (US); Theo Geussens, Samstagern (CH); Brayden E. Glad, Manvel, TX (US); Andrew T. Heitsch, Angleton, TX (US); Yushan Hu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 274 days.

(21) Appl. No.: 18/261,858

(22) PCT Filed: Apr. 7, 2022

(86) PCT No.: PCT/US2022/023764
§ 371 (c)(1),
(2) Date: Jul. 18, 2023

(87) PCT Pub. No.: WO2022/221117
PCT Pub. Date: Oct. 20, 2022

(65) Prior Publication Data
US 2024/0076481 A1 Mar. 7, 2024

Related U.S. Application Data

(60) Provisional application No. 63/175,289, filed on Apr. 15, 2021.

(51) Int. Cl.
*C08L 23/0807* (2025.01)
*C09D 123/08* (2006.01)
*H01B 3/44* (2006.01)

(52) U.S. Cl.
CPC .... *C08L 23/0815* (2013.01); *C09D 123/0815* (2013.01); *H01B 3/441* (2013.01)

(58) Field of Classification Search
CPC .......... C08K 5/005; C08K 3/16; C08K 5/098; C08K 5/3415; C08L 23/0815; C08L 83/04; C08L 2203/202; C08L 2205/025; C08L 23/10; C09D 123/0815; H01B 3/441
See application file for complete search history.

(56) References Cited

U.S. PATENT DOCUMENTS

| | | | |
|---|---|---|---|
| 4,535,113 A | 8/1985 | Foster et al. | |
| 6,472,077 B1 | 10/2002 | Cretekos et al. | |
| 8,541,515 B1 | 9/2013 | Berg | |
| 8,912,253 B2 | 12/2014 | Montes et al. | |
| 9,422,424 B2 | 8/2016 | Roy et al. | |
| 9,701,859 B2 | 7/2017 | Chen et al. | |
| 9,796,837 B2 | 10/2017 | Alric et al. | |
| 10,763,010 B2 | 9/2020 | Sasse et al. | |
| 2003/0139530 A1 | 7/2003 | Starita | |
| 2005/0004316 A1 | 1/2005 | Starita | |
| 2005/0261435 A1 | 11/2005 | Starita | |
| 2007/0213468 A1 | 9/2007 | Wilson et al. | |
| 2019/0161602 A1 | 5/2019 | Chang et al. | |
| 2019/0291933 A1 | 9/2019 | Nunez et al. | |
| 2020/0062937 A1* | 2/2020 | Yamaki | C08L 23/0815 |
| 2020/0199336 A1 | 6/2020 | Ongayi et al. | |

FOREIGN PATENT DOCUMENTS

| | | |
|---|---|---|
| CA | 2455946 | 1/2004 |
| CN | 104292596 | 1/2015 |
| CN | 105922699 | 9/2016 |
| EP | 0710570 | 5/1996 |
| EP | 719836 | 7/1996 |
| EP | 2831187 | 11/2017 |
| EP | 3390524 | 10/2018 |
| WO | 1998013419 | 4/1998 |
| WO | 2004007610 | 1/2004 |
| WO | 2005068076 | 7/2005 |
| WO | 2006025644 | 3/2006 |
| WO | 2006045550 | 5/2006 |

(Continued)

OTHER PUBLICATIONS

Balke, "A Strategy for Interpreting Multidetector Size-Exclusion Chromatography Data II. Multidector SEC Data in Plastic Waste Recovery", Chromatography of Polymers, 1992, ch. 13, pp. 198-219.
Kratochvil, "Classical Light Scattering from Polymer Solutions", Elsevier Science, 1987, pp. 113-144, Oxford, NY.
Mourey "A Strategy for Interpreting Multidetector Size-Exclusion Chromatohraphy Data. I. Development of a Systematic Approach", Chromatography Polym., 1992, pp. 180-197, ch. 12.
Williams "The Construction of a Polyethylene Calibration Curve for Gel Permeation Chromatography Using Polysytrene Fractions", The Polymer Letters, 1968, pp. 621-624, vol. 6, Journal of Polymer Science.

(Continued)

*Primary Examiner* — Lynda Salvatore

(57) ABSTRACT

A polymeric composition includes a resin including an ethylene-based polymer and a copolymer of ethylene and an alpha olefin comonomer. The resin has a High Mw Comonomer Content of 3.2 wt % or greater based on a total weight of the resin over the weight average molecular weight range of $10^5$ g/mol to $10^{5.5}$ g/mol as measured by Ethylene GPC. The polymeric composition has a Relevant Comonomer Content of 0.6 wt % or greater. The polymeric composition also includes at least one of (i) a polydimethylsiloxane having a weight average molecular weight of 550,000 g/mol to 650,000 g/mol as measured according to Component GPC and (ii) a polymeric ultraviolet light stabilizer comprising a hindered amine moiety and having a weight average molecular weight from 5,000 g/mol to 20,000 g/mol as measured according to Component GPC.

10 Claims, No Drawings

(56) References Cited

FOREIGN PATENT DOCUMENTS

| WO | 2013110727 | | 8/2013 | |
| WO | WO-2013110727 A2 * | 8/2013 | ............ H01B 3/441 |
| WO | 2013169485 | | 11/2013 | |
| WO | 2014044759 | | 3/2014 | |
| WO | 2014096104 | | 6/2014 | |
| WO | 2014099360 | | 6/2014 | |
| WO | 2015121161 | | 8/2015 | |
| WO | 2015150218 | | 10/2015 | |
| WO | 2017208081 | | 12/2017 | |
| WO | 2018226585 | | 12/2018 | |
| WO | 2018226591 | | 12/2018 | |
| WO | 2019068815 | | 4/2019 | |
| WO | 2019213524 | | 11/2019 | |
| WO | 2022076296 | | 4/2022 | |
| WO | WO-2022076296 A1 * | 4/2022 | .......... C08L 23/0815 |

OTHER PUBLICATIONS

Zimm, "Apparatus and Methods for Measurement and Interpretation of the Angular Variation of Light Scattering; Preliminary Results on Polystyrene Solutions", J. Chem. Phys., 1948, pp. 1099-1116, vol. 16, No. 12.

Search Report and Written Opinion from corresponding International Application No. PCT/US2022/023764 dated Aug. 4, 2022.

International Preliminary Report on Patentability from corresponding International Application No. PCT/ US2022/023764.

International Preliminary Report on Patentability from corresponding International Application No. PCT/US2022/023764 dated Oct. 12, 2023.

* cited by examiner

POLYMERIC COMPOSITIONS

BACKGROUND

Field of the Invention

The present disclosure generally relates to polymeric compositions and more specifically to polymeric compositions exhibiting enhanced aging properties, reduced shrinkback and at least one of a low unaged coefficient of friction and laser printability.

Introduction

Fiber optic cables are useful for transmitting data at high rates across long distances and as such are subject to increasing use. Fiber optic cables are trending toward down gauging and light weighting which requires new mini- and micro-cable technology for high fiber density constructions. A variety of performance properties are desired in polymeric jacketing when used in fiber-optics. A first desirable property is for the polymeric jacketing material to exhibit is a cyclic temperature shrinkback of 2.5% or less to minimize signal attenuation. A second desirable property for the polymeric jacketing to exhibit is a retained tensile elongation at break of 75% or greater after heat aging to ensure cable longevity.

The desired properties of a polymeric jacketing are also defined by the installation environment of the fiber optic cables. Fiber-optic cables are often blown and/or pushed into existing conduits and ducts in order to increase fiber densification in structures. In order to effectively install fiber optic cables in such a manner, the polymeric composition of jacketing on the cables need to have a low coefficient of friction ("COF"). The low coefficient of friction of the polymeric compositions ensures that the wires and cables do not resist sliding along surfaces during the installation. Typically, the polymeric composition of the jacketing needs to exhibit an unaged COF of 0.20 or less as measured according to ASTM D1894 in order to be most effective in the application. Reduction of the COF of polymeric compositions has been attempted using slip agents. Slip agents function as a lubricant on the polymeric composition surface during processing or in use environments. These slip agents often function by migrating, or blooming, to the surface of the polymeric composition where they provide a coating that reduces the COF.

With enhanced fiber densification come the increased need for easy and reliable cable identification. Laser beam printing is a method used in the marking of polymeric compositions. Laser beam printing is useful because no printing ink or physical contact between the polymeric composition and the printer are required and laser printing enables fine marking on small cable designs and delivers significantly higher print durability. However, not every polymeric composition can be laser printed. For example, polymeric compositions often require specific additives and compositions in order to be rendered laser printable. The requirements to render a polymeric composition laser printable may be in conflict with the design of the polymeric composition based on its end use. For example, conventional jacketing may include carbon black in concentrations from about 2 weight percent to 3 weight percent to ensure 50% retention of elongation at break after 2000 hours of accelerated ultraviolet exposure. Unfortunately, conventional carbon black concentrations of about 2 weight percent or greater lead to insufficient contrast (i.e., 25% contrast or less) when laser printing.

In view of the intricate balance of desirable properties, it would be surprising to discover a polymeric composition useful as a cable jacketing that exhibits a cyclic temperature shrinkback of 2.5% or less, a retained tensile elongation at break of 75% after heat aging and which may also exhibit an unaged COF of 0.20 and/or be laser printable.

SUMMARY OF THE INVENTION

The present invention offers a polymeric composition useful as a cable jacketing that exhibits a cyclic temperature shrinkback of 2.5% or less, a retained tensile elongation at break of 75% after heat aging and which may also exhibit an unaged COF of 0.20 and/or be laser printable.

The present invention is a result of discovering that a polymeric composition using a copolymer having a comonomer content of 3.2 wt % or greater over the weight average molecular weight (Mw) range of $10^5$ g/mol to $10^{5.5}$ g/mol ("High Mw Comonomer Content") with a "Relevant Comonomer Content" (defined below) of 0.6 wt % or greater combined with one or more of a polydimethylsiloxane having a weight average molecular weight of 550,000 g/mol to 650,000 g/mol and a polymeric ultraviolet light stabilizer comprising a hindered amine moiety and having a weight average molecular weight from 5,000 g/mol to 20,000 g/mol, can achieve the above-noted properties. Under tensile load the tie chains orient along the tensile axis during the final deformation stage. Strong tie chains are required for strain hardening to occur and to meet the requirement of retained tensile elongation at break of 75% after heat aging. Without being bound by theory, it is believed that a High Mw Comonomer Content of 3.2 wt % or greater over the molecular weight range of $10^5$ g/mol to $10^{5.5}$ g/mol with a Relevant Comonomer Content of 0.6 wt % or greater strengthens the tie molecules between crystallites such that polymeric composition's elongation at break is strengthened while cyclic temperature shrinkback is maintained to less than 2.5%. Surprisingly, the introduction of one or more of a polydimethylsiloxane having a weight average molecular weight of 550,000 g/mol to 650,000 g/mol and a polymeric ultraviolet light stabilizer comprising a hindered amine moiety and having a weight average molecular weight from 5,000 g/mol to 20,000 g/mol does not compromise the polymer architecture. It is believed that molecular weight of the polydimethylsiloxane provides a viscosity similar to the copolymer resulting in a uniform dispersion within the polymeric composition during melt compounding and thus the polymeric composition is able to exhibit an unaged COF of 0.20 or less as measured according to ASTM D1894. With respect to polymeric ultraviolet light stabilizer, it is believed that the higher molecular weight of the polymeric UV light stabilizer, as opposed to the oligomeric UV light stabilizers of the prior art, resists migration and segregation during manufacturing and use of the polymeric composition. The reduced migration of the polymeric UV light stabilizer provides enhanced preservation to the stabilizer during extended exposure to UV light thereby eliminating the necessity of carbon black and rendering the polymeric composition laser printable.

The present invention is particularly useful for wire and cable jackets.

According to a first feature of the present disclosure, a polymeric composition comprise a resin comprising an ethylene-based polymer and a copolymer of ethylene and an alpha olefin comonomer, wherein the resin has a High Mw Comonomer Content of 3.2 wt % or greater based on a total weight of the resin over the weight average molecular weight range of $10^5$ g/mol to $10^{5.5}$ g/mol as measured by Ethylene GPC, and wherein the polymeric composition has a Relevant Comonomer Content of 0.6 wt % or greater; and at least one of (i) a polydimethylsiloxane having a weight average molecular weight of 550,000 g/mol to 650,000 g/mol as measured according to Component GPC and (ii) a polymeric ultraviolet light stabilizer comprising a hindered amine moiety and having a weight average molecular weight from 5,000 g/mol to 20,000 g/mol as measured according to Component GPC.

According to a second feature of the present disclosure, the polymeric composition comprises both (i) and (ii).

According to a third feature of the present disclosure, the polymeric composition comprises from 0.25 wt % to 2 wt % of the polymeric ultraviolet light stabilizer based on a total weight of the polymeric composition.

According to a fourth feature of the present disclosure, the polymeric composition comprises 0.10 wt % to 0.25 wt % of carbon black based on a total weight of the polymeric composition.

According to a fifth feature of the present disclosure, the polymeric ultraviolet light stabilizer has a weight average molecular weight from 8,000 g/mol to 12,000 g/mol as measured according to Component GPC, and wherein the polymeric ultraviolet light stabilizer has a chemical abstract services registration number of 136504-96-6.

According to a sixth feature of the present disclosure, the polymeric composition comprises from 35 wt % to 85 wt % of the copolymer based on the total weight of the polymeric composition.

According to a seventh feature of the present disclosure, the polymeric composition comprises from greater than 0 wt % to 10 wt % of the polydimethylsiloxane based on the total weight of the polymeric composition.

According to an eight feature of the present disclosure, the resin has a High Mw Comonomer Content of 12.0 wt % or less over the molecular weight range of $10^5$ g/mol to $10^{5.5}$ g/mol as measured by Ethylene GPC.

According to a ninth feature of the present disclosure, 30 wt % or less of the total weight of the resin has a molecular weight in the range of $10^5$ g/mol to $10^{5.5}$ g/mol as measured by Ethylene GPC.

According to a tenth feature of the present disclosure, a coated conductor comprises a conductor; and the polymeric composition disposed at least partially around the conductor.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); IEC refers to International Electrotechnical Commission; EN refers to European Norm; DIN refers to Deutsches Institut für Normung; and ISO refers to International Organization for Standards.

As used herein, the term weight percent ("wt %") designates the percentage by weight a component is of a total weight of the polymeric composition unless otherwise specified.

Melt index ($I_2$) values herein refer to values determined according to ASTM method D1238 at 190 degrees Celsius (° C.) with 2.16 Kilogram (kg) mass and are provided in units of grams eluted per ten minutes ("g/10 min."). Melt index ($I_{21}$) values herein refer to values determined according to ASTM method D1238 at 190 degrees Celsius (° C.) with 21.6 kg mass and are provided in units of grams eluted per ten minutes g/10 min.

Density values herein refer to values determined according to ASTM D792 at 23° C. and are provided in units of grams per cubic centimeter ("g/cc").

As used herein, Chemical Abstract Services registration numbers ("CAS #") refer to the unique numeric identifier as most recently assigned as of the priority date of this document to a chemical compound by the Chemical Abstracts Service.

Polymeric Composition

The polymeric composition comprises a resin and at least one of (i) a polydimethylsiloxane having a weight average molecular weight of 550,000 g/mol to 650,000 g/mol as measured according to Ethylene GPC and (ii) a polymeric ultraviolet light stabilizer comprising a hindered amine moiety and having a weight average molecular weight from 5,000 g/mol to 20,000 g/mol as measured according to Component GPC. The resin comprises an ethylene-based polymer and a copolymer of ethylene and an alpha olefin comonomer ("copolymer"). The polymeric composition, in an unfilled state, has a density of 0.945 g/cc to 0.970 g/cc. For example, the unfilled density of the polymeric composition may be 0.945 g/cc or greater, or 0.946 g/cc or greater, or 0.948 g/cc or greater, or 0.950 g/cc or greater, or 0.952 g/cc or greater, or 0.954 g/cc or greater, or 0.955 g/cc or greater, or 0.956 g/cc or greater, or 0.958 g/cc or greater, or 0.960 g/cc or greater, or 0.962 g/cc or greater, or 0.964 g/cc or greater, or 0.966 g/cc or greater, or 0.968 g/cc or greater, while at the same time, 0.970 g/cc or less, or 0.968 g/cc or less, or 0.966 g/cc or less, or 0.964 g/cc or less, or 0.962 g/cc or less, or 0.960 g/cc or less, or 0.958 g/cc or less, or 0.956 g/cc or less, or 0.954 g/cc or less, or 0.952 g/cc or less, or 0.950 g/cc or less, or 0.948 g/cc or less, or 0.946 g/cc or less. As defined herein, the "unfilled state" of the polymeric composition is defined as the polymeric composition consisting essentially of the copolymer of ethylene and an alpha olefin comonomer, the ethylene-based polymer, and at least one of the polydimethylsiloxane and the polymeric ultraviolet light stabilizer.

Copolymer

One component of the polymeric composition is the copolymer of ethylene and an alpha olefin comonomer. "Polymer" means a macromolecular compound comprising a plurality of monomers of the same or different type which are bonded together and a copolymer is a polymer prepared from two or more different monomer types. The copolymer can include ethylene and one or more $C_3$-$C_{20}$ α-olefin comonomers such as propylene, 1-butene, 1-pentene, 4-methyl-1-pentene, 1-hexene, and 1-octene. The copolymer can have a unimodal or a multimodal molecular weight distribution. As used herein, "unimodal" denotes a polymeric material having a molecular weight distribution ("MWD") such that its gel permeation chromatography curve exhibits only a single peak with no discernible second peak, or even a shoulder or hump, relative to such single peak. In contrast, as used herein, "bimodal" means that the MWD in a gel permeation chromatography curve exhibits the presence of two component polymers, such as by having two peaks or where one component may be indicated by a hump, shoulder, or tail relative to the peak of the other component polymer. The copolymer can be prepared with either Ziegler-Natta, chromium-based, constrained geometry or metallocene catalysts in slurry reactors, gas phase or solution reactors.

The copolymer may comprise 50 wt % or greater, 60 wt % or greater, 70 wt % or greater, 80 wt % or greater, 85 wt % or greater, 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 98 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less, or 90 wt % or less, or 85 wt % or less, or 80 wt % or less, or 70 wt % or less, or 60 wt % or less of ethylene as measured using Nuclear Magnetic Resonance (NMR) or Fourier-Transform Infrared (FTIR) Spectroscopy.

The copolymer may be a high-density polyethylene ("HDPE"). The copolymer has a density of 0.945 g/cc to 0.960 g/cc. For example, the density of the copolymer may be 0.945 g/cc or greater, or 0.946 g/cc or greater, or 0.948 g/cc or greater, or 0.950 g/cc or greater, or 0.952 g/cc or greater, or 0.954 g/cc or greater, or 0.955 g/cc or greater, or 0.956 g/cc or greater, or 0.958 g/cc or greater, while at the same time, 0.960 g/cc or less, or 0.958 g/cc or less, or 0.956 g/cc or less, or 0.955 g/cc or less, or 0.954 g/cc or less, or 0.952 g/cc or less, or 0.950 g/cc or less, or 0.948 g/cc or less, or 0.946 g/cc or less as measured according to ASTM D792.

The copolymer may have a melt index ($I_2$) of 0.1 g/10 min. or greater, or 0.3 g/10 min. or greater, or 0.5 g/10 min. or greater, or 1.0 g/10 min. or greater, or 1.5 g/10 min. or greater, or 2.0 g/10 min. or greater, or 2.5 g/10 min. or greater, or 3.0 g/10 min. or greater, or 3.5 g/10 min. or greater, or 4.0 g/10 min. or greater, or 4.5 g/10 min. or greater, or 5.0 g/10 min. or greater, or 5.5 g/10 min. or greater, or 6.0 g/10 min. or greater, or 6.5 g/10 min. or greater, or 7.0 g/10 min. or greater, or 7.5 g/10 min. or greater, or 8.0 g/10 min. or greater, or 8.5 g/10 min. or greater, or 9.0 g/10 min. or greater, or 9.5 g/10 min. or greater, while at the same time, 10.0 g/10 min. or less, or 9.5 g/10 min. or less, or 9.0 g/10 min. or less, or 8.5 g/10 min. or less, or 8.0 g/10 min. or less, or 7.5 g/10 min. or less, or 7.0 g/10 min. or less, or 6.5 g/10 min. or less, or 6.0 g/10 min. or less, or 5.5 g/10 min. or less, or 5.0 g/10 min. or less, or 4.5 g/10 min. or less, or 4.0 g/10 min. or less, or 3.5 g/10 min. or less, or 3.0 g/10 min. or less, or 2.5 g/10 min. or less, or 2.0 g/10 min. or less, or 1.5 g/10 min. or less, or 1.0 g/10 min. or less, or 0.5 g/10 min. or less, or 0.3 g/10 min. or less.

The copolymer may have a melt index ($I_{21}$) of 90 g/10 min. or greater, or 92 g/10 min. or greater, or 94 g/10 min. or greater, or 96 g/10 min. or greater, or 98 g/10 min. or greater, or 100 g/10 min. or greater, or 102 g/10 min. or greater, or 104 g/10 min. or greater, or 106 g/10 min. or greater, or 108 g/10 min. or greater, or 110 g/10 min. or greater, or 112 g/10 min. or greater, or 114 g/10 min. or greater, or 116 g/10 min. or greater, or 118 g/10 min., while at the same time, 120 g/10 min. or less, or 118 g/10 min. or less, or 116 g/10 min. or less, or 114 g/10 min. or less, or 112 g/10 min. or less, or 110 g/10 min. or less, or 108 g/10 min. or less, or 106 g/10 min. or less, or 104 g/10 min. or less, or 102 g/10 min. or less, or 100 g/10 min. or less, or 98 g/10 min. or less, or 96 g/10 min. or less, or 94 g/10 min. or less, or 92 g/10 min. or less.

The polymeric composition may comprise from 35 wt % to 80 wt % of the copolymer. For example, the polymeric composition may comprise 35 wt % or greater, or 40 wt % or greater, or 45 wt % or greater, or 50 wt % or greater, or 55 wt % or greater, or 60 wt % or greater, or 65 wt % or greater, or 70 wt % or greater, or 75 wt % or greater, or 80 wt % or greater, while at the same time, 85 wt % or less, or 80 wt % or less, or 75 wt % or less, or 70 wt % or less, or 65 wt % or less, or 60 wt % or less, or 55 wt % or less, or 50 wt % or less, or 45 wt % or less, or 40 wt % or less of the copolymer based on a total weight of the polymeric composition.

Ethylene-Based Polymer

As noted above, the resin and the polymeric composition may comprise the ethylene-based polymer. As used herein, "ethylene-based" polymers are polymers in which greater than 50 wt % of the monomers are ethylene though other co-monomers may also be employed. The ethylene-based polymer can include ethylene and one or more $C_3$-$C_{20}$ α-olefin comonomers such as propylene, 1-butene, 1 pentene, 4-methyl-1-pentene, 1-hexene, and 1-octene. The ethylene-based polymer can have a unimodal or a multimodal molecular weight distribution and can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc.). If a blend of ethylene-based polymers is employed, the polymers can be blended by any in-reactor or post-reactor process.

The ethylene-based polymer may comprise 50 wt % or greater, 60 wt % or greater, 70 wt % or greater, 80 wt % or greater, 85 wt % or greater, 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 98 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less, or 90 wt % or less, or 85 wt % or less, or 80 wt % or less, or 70 wt % or less, or 60 wt % or less of ethylene as measured using Nuclear Magnetic Resonance (NMR) or Fourier-Transform Infrared (FTIR) Spectroscopy. Other units of the ethylene-based polymer may include $C_3$, or $C_4$, or $C_6$, or $C_8$, or $C_{10}$, or $C_{12}$, or $C_{16}$, or $C_{18}$, or $C_{20}$ α-olefins, such as propylene, 1-butene, 1-hexene, 4-methyl-1-pentene, and 1-octene.

The polymeric composition may comprise from 15 wt % to 55 wt % of the ethylene-based polymer. For example, the polymeric composition comprises 15 wt % or greater, or 20 wt % or greater, or 25 wt % or greater, or 30 wt % or greater, or 35 wt % or greater, or 40 wt % or greater, or 45 wt % or greater, or 50 wt % or greater, while at the same time, 55 wt % or less, or 50 wt % or less, or 45 wt % or less, or 40 wt % or less, or 35 wt % or less, or 30 wt % or less, or 25 wt % or less, or 20 wt % or less of the ethylene-based polymer.

The ethylene-based polymer may be a linear low-density polyethylene ("LLDPE"). In LLDPE examples, the polymeric composition may comprise 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, or 25 wt % or greater, or 26 wt % or greater, or 27 wt % or greater, or 28 wt % or greater, or 29 wt % or greater, while at the same time, 30 wt % or less, or 29 wt % or less, or 28 wt % or less, or 27 wt % or less, or 26 wt % or less, or 25 wt % or less, or 24 wt % or less, or 23 wt % or less, or 22 wt % or less, or 21 wt % or less, or 20 wt % or less, or 19 wt % or less, or 18 wt % or less, or 17 wt % or less, or 16 wt % or less of the of the ethylene-based polymer. The LLDPE examples of the ethylene-based polymer may have a density of 0.910 g/cc or greater, or 0.912 g/cc or greater, or 0.914 g/cc or greater or 0.916 g/cc or greater or 0.918 g/cc or greater, or 0.920 g/cc or greater, or 0.922 g/cc or greater, or 0.924 g/cc or greater or 0.926 g/cc or greater or 0.928 g/cc or greater, while at the same time, 0.930 g/cc or less, or 0.928 g/cc or less, or 0.926 g/cc or less, or 0.924 g/cc or less, or 0.922 g/cc or less, or 0.920 g/cc or less, or 0.918 g/cc or less, or 0.916 g/cc or less, or 0.914 g/cc or less, or 0.912 g/cc or less as measured according to ASTM D792. The LLPDE examples of the ethylene-based polymer may have a melt index ($I_2$) of 0.1 g/10 min. or greater, or 0.2 g/10 min. or greater, or 0.4 g/10 min. or greater, or 0.56 g/10 min. or greater, or 0.6 g/10 min. or greater, or 0.8 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less.

The ethylene-based polymer may be a plastomer. In plastomer examples, the polymeric composition may comprise 15 wt % or greater, or 16 wt % or greater, or 17 wt % or greater, or 18 wt % or greater, or 19 wt % or greater, while at the same time, 20 wt % or less, or 19 wt % or less, or 18 wt % or less, or 17 wt % or less, or 16 wt % or less of the of the ethylene-based polymer. The plastomer examples of the ethylene-based polymer may have a density of 0.900 g/cc or greater, or 0.901 g/cc or greater, or 0.902 g/cc or greater or 0.903 g/cc or greater or 0.904 g/cc or greater, or 0.905 g/cc or greater, or 0.906 g/cc or greater, or 0.907 g/cc or greater or 0.908 g/cc or greater or 0.909 g/cc or greater, while at the same time, 0.910 g/cc or less, or 0.909 g/cc or less, or 0.908 g/cc or less, or 0.907 g/cc or less, or 0.906 g/cc or less, or 0.905 g/cc or less, or 0.904 g/cc or less, or 0.903 g/cc or less, or 0.902 g/cc or less, or 0.901 g/cc or less as measured according to ASTM D792. The plastomer examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less.

The ethylene-based polymer may be a HDPE. In HDPE examples, the polymeric composition may comprise 45 wt % or greater, or 46 wt % or greater, or 47 wt % or greater, or 48 wt % or greater, or 49 wt % or greater, or 50 wt % or greater, or 51 wt % or greater, or 52 wt % or greater, or 53 wt % or greater, or 54 wt % or greater, while at the same time, 55 wt % or less, or 54 wt % or less, or 53 wt % or less, or 52 wt % or less, or 51 wt % or less, or 50 wt % or less, or 49 wt % or less, or 48 wt % or less, or 47 wt % or less, or 46 wt % or less of the ethylene-based polymer. The HDPE examples of the ethylene-based polymer may have a density of 0.930 g/cc or greater, or 0.932 g/cc or greater, or 0.934 g/cc or greater or 0.936 g/cc or greater or 0.938 g/cc or greater, or 0.940 g/cc or greater, or 0.942 g/cc or greater, or 0.944 g/cc or greater or 0.946 g/cc or greater or 0.948 g/cc or greater, while at the same time, 0.950 g/cc or less, or 0.948 g/cc or less, or 0.946 g/cc or less, or 0.944 g/cc or less, or 0.942 g/cc or less, or 0.940 g/cc or less, or 0.938 g/cc or less, or 0.936 g/cc or less, or 0.934 g/cc or less, or 0.932 g/cc or less as measured according to ASTM D792. The HDPE examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less.

The ethylene-based polymer may be an elastomer. In elastomer examples, the polymeric composition may comprise 10 wt % or greater, or 11 wt % or greater, or 12 wt % or greater, or 13 wt % or greater, or 14 wt % or greater, while at the same time, 15 wt % or less, or 14 wt % or less, or 13 wt % or less, or 12 wt % or less, or 11 wt % or less of the ethylene-based polymer. The elastomer examples of the ethylene-based polymer may have a density of 0.80 g/cc or greater, or 0.81 g/cc or greater, or 0.82 g/cc or greater or 0.83 g/cc or greater or 0.84 g/cc or greater, or 0.85 g/cc or greater, or 0.86 g/cc or greater, or 0.87 g/cc or greater, or 0.874 g/cc or greater, or 0.88 g/cc or greater, or 0.89 g/cc or greater, while at the same time, 0.90 g/cc or less, or 0.89 g/cc or less, or 0.88 g/cc or less, or 0.874 g/cc or less, or 0.87 g/cc or less, or 0.86 g/cc or less, or 0.85 g/cc or less, or 0.84 g/cc or less, or 0.83 g/cc or less, or 0.82 g/cc or less, or 0.81 g/cc or less as measured according to ASTM D792. The elastomer examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less.

It will be understood that two or more of the LLDPE, plastomer, HDPE and elastomer examples of the ethylene-based polymer may be utilized in the polymeric composition without departing from the teachings provided herein.

Polyethylene Glycol

The polymeric composition may comprise polyethylene glycol. Polyethylene glycol refers to an oligomer or polymer of ethylene oxide represented by Structure (I):

$$H-(O-CH_2-CH_2)_q-OH \quad \text{Structure (I)}$$

where q refers to the number of repeat units in the polyethylene glycol polymer. The q value for the polyethylene glycol may be in a range from 200 to 10,000.

The weight average molecular weight of the polyethylene glycol may be 10,000 g/mol or more, or 20,000 g/mol or more, or 30,000 g/mol or more, or 35,000 g/mol or more, or 40,000 g/mol or more, or 45,000 g/mol or more, or 50,000 g/mol or more, or 55,000 g/mol or more, or 60,000 g/mol or more, or 65,000 g/mol or more, or 70,000 g/mol or more, or 75,000 g/mol or more, or 80,000 g/mol or more, or 85,000 g/mol or more, or 90,000 g/mol or more, or 95,000 g/mol or more, while at the same time, 100,000 g/mol or less, or 90,000 g/mol or less, or 85,000 g/mol or less, or 80,000 g/mol or less, or 75,000 g/mol or less, or 70,000 g/mol or less, or 65,000 g/mol or less, or 60,000 g/mol or less, or 55,000 g/mol or less, or 50,000 g/mol or less, or 45,000 g/mol or less, or 40,000 g/mol or less, or 35,000 g/mol or less, or 30,000 g/mol or less, or 25,000 g/mol or less, or 20,000 g/mol or less, or 15,000 g/mol or less as measured by Component GPC. A blend of different average molecular weight polyethylene glycols, at the same or different weight percent, may be utilized in the polymeric composition.

The polyethylene glycol may be from 0.1 wt % to 2 wt % of the polymeric composition. The polymeric composition may comprise the polyethylene glycol at 0.1 wt % or greater, or 0.2 wt % or greater, or 0.3 wt % or greater, or 0.4 wt % or greater, or 0.5 wt % or greater, or 0.6 wt % or greater, or 0.7 wt % or greater, or 0.8 wt % or greater, or 0.9 wt % or greater, or 1.0 wt % or greater, or 1.1 wt % or greater, or 1.2 wt % or greater, or 1.3 wt % or greater, or 1.4 wt % or greater, or 1.5 wt % or greater, or 1.6 wt % or greater, or 1.7 wt % or greater, or 1.8 wt % or greater, or 1.9 wt % or greater, while at the same time, 2.0 wt % or less, or 1.9 wt % or less, or 1.8 wt % or less, or 1.7 wt % or less, or 1.6 wt % or less, or 1.5 wt % or less, or 1.4 wt % or less, or 1.3 wt % or less, or 1.2 wt % or less, or 1.1 wt % or less, or 1.0 wt % or less, or 0.9 wt % or less, or 0.8 wt % or less, or 0.7 wt % or less, or 0.6 wt % or less, or 0.5 wt % or less, or 0.4 wt % or less, or 0.3 wt % or less, or 0.2 wt % or less.

Polydimethylsiloxane

The polymeric composition may comprise polydimethylsiloxane ("PDMS"). The PDMS may be unsubstituted or substituted. A "substituted PDMS" is a PDMS in which at least one methyl group of the PDMS is substituted with a substituent. Nonlimiting examples of substituents include halogen atoms (such as chlorine, fluorine, bromine, and iodine); halogen atom-containing groups (such as chloromethyl groups, perfluorobutyl groups, trifluoroethyl groups, and nonafluorohexyl groups); oxygen atom-containing groups (such as hydroxy groups, alkoxy groups (such as methoxy groups and ethoxy groups), (meth)acrylic epoxy groups, and carboxyl groups); nitrogen atom-containing groups (such as amino-functional groups, amido-functional groups, and cyano-functional groups); sulphur atom-containing groups (such as mercapto groups); hydrogen; $C_2$-$C_{10}$ alkyl groups (such as an ethyl group); $C_2$-$C_{10}$ alkynyl groups; alkenyl groups (such as vinyl groups and hexenyl groups); aryl groups (such as phenyl groups and substituted phenyl groups); cycloalkyl groups (such as cyclohexane groups); and combinations thereof. The substituted methyl group may be a terminal methyl group or a non-terminal methyl group. Nonlimiting examples of suitable substituted PDMS include trialkylsilyl terminated PDMS wherein at least one alkyl is a $C_2$-$C_{10}$ alkyl; dialkylhydroxysilyl terminated PDMS; dialkylhydrogensilyl terminated PDMS; dialkylalkenyl silyl terminated PDMS; dialkylvinylsilyl terminated PDMS, dimethylhydroxysilyl terminated PDMS, and dimethylvinylsilyl terminated PDMS.

The PDMS has a weight average molecular weight of 550,000 g/mol to 650,000 g/mol as measured according to Component GPC described in greater detail below. For example, the PDMS may have a Mw of 550,000 g/mol or greater, or 560,000 g/mol or greater, or 570,000 g/mol or greater, or 580,000 g/mol or greater, or 590,000 g/mol or greater, or 600,000 g/mol or greater, or 610,000 g/mol or greater, or 620,000 g/mol or greater, or 630,000 g/mol or greater, or 640,000 g/mol or greater, while at the same time, 650,00 g/mol or less, or 640,000 g/mol or less, or 630,000 g/mol or less, or 620,000 g/mol or less, or 610,000 g/mol or less, or 600,000 g/mol or less, or 590,000 g/mol or less, or 580,000 g/mol or less, or 570,000 g/mol or less, or 560,000 g/mol or less as measured according to Component GPC. The polymeric composition may be free of a polydimethylsiloxane having a weight average molecular weight of 30,000 g/mol to 300,000 g/mol as measured according to Component GPC. As used herein, the term "free of" is defined to mean that the polymeric composition comprises 0.01 wt % or less of the material it is free of.

The polymeric composition may comprise 0.1 wt % or greater, or 0.5 wt % or greater, or 1 wt % or greater, or 2 wt % or greater, or 3 wt % or greater, or 4 wt % or greater, or 5 wt % or greater, or 6 wt % or greater, or 7 wt % or greater, or 8 wt % or greater, or 9 wt % or greater, while at the same time, 10 wt % or less, or 9 wt % or less, or 8 wt % or less, or 7 wt % or less, or 6 wt % or less, or 5 wt % or less, or 4 wt % or less, or 3 wt % or less, or 2 wt % or less, or 1 wt % or less of the PDMS based on the total weight of the polymeric composition.

Second Polydimethylsiloxane

The polymeric composition may comprise a second polydimethylsiloxane that has a lower Mw than the PDMS having a Mw of 550,000 g/mol to 650,000 g/mol. The second PDMS may be substituted or unsubstituted and may be terminated in any of the above-noted matters.

The second PDMS has a weight average molecular weight of 2,000 g/mol to 15,000 g/mol as measured according to Component GPC. For example, the PDMS may have a Mw of 2,000 g/mol or greater, or 3,000 g/mol or greater, or 4,000 g/mol or greater, or 5,000 g/mol or greater, or 6,000 g/mol or greater, or 7,000 g/mol or greater, or 8,000 g/mol or greater, or 9,000 g/mol or greater, or 10,000 g/mol or greater, or 11,000 g/mol or greater, or 12,000 g/mol or greater, or 13,000 g/mol or greater, or 14,000 g/mol or greater, while at the same time, 15,00 g/mol or less, or 14,000 g/mol or less, or 13,000 g/mol or less, or 12,000 g/mol or less, or 11,000 g/mol or less, or 10,000 g/mol or less, or 9,000 g/mol or less, or 8,000 g/mol or less, or 7,000 g/mol or less, or 6,000 g/mol or less, or 5,000 g/mol or less, or 4,000 g/mol or less, or 3,000 g/mol or less as measured according to Component GPC.

The polymeric composition may comprise 0.1 wt % or greater, or 0.5 wt % or greater, or 1 wt % or greater, or 2 wt % or greater, or 3 wt % or greater, or 4 wt % or greater, or 5 wt % or greater, or 6 wt % or greater, or 7 wt % or greater, or 8 wt % or greater, or 9 wt % or greater, while at the same time, 10 wt % or less, or 9 wt % or less, or 8 wt % or less, or 7 wt % or less, or 6 wt % or less, or 5 wt % or less, or 4 wt % or less, or 3 wt % or less, or 2 wt % or less, or 1 wt % or less of the PDMS based on the total weight of the polymeric composition.

Carbon Black

The polymeric composition may comprise carbon black. Carbon black has CAS registration number of 1333-86-4. Carbon black is useful in preventing damage to the polymeric composition from sunlight exposure but can negatively impact laser printability of the polymeric composition. The polymeric composition may comprise the carbon black in an amount from 0.00 wt % to 0.25 wt % based on a total weight of the polymeric composition in laser printable examples. For example, the polymeric composition may comprise 0.00 wt % or greater, or 0.05 wt % or greater, or 0.06 wt % or greater, or 0.07 wt % or greater, or 0.08 wt % or greater, or 0.09 wt % or greater, or 0.10 wt % or greater, or 0.11 wt % or greater, or 0.12 wt % or greater, or 0.13 wt % or greater, or 0.14 wt % or greater, or 0.15 wt % or greater, or 0.16 wt % or greater, or 0.17 wt % or greater, or 0.18 wt % or greater, or 0.19 wt % or greater, or 0.20 wt % or greater, or 0.21 wt % or greater, or 0.22 wt % or greater, or 0.23 wt % or greater, or 0.24 wt % or greater, while at the same time, 0.25 wt % or less, or 0.24 wt % or less, or 0.23 wt % or less, or 0.22 wt % or less, or 0.21 wt % or less, or 0.20 wt % or less, or 0.19 wt % or less, or 0.18 wt % or less, or 0.17 wt % or less, or 0.16 wt % or less, or 0.15 wt % or less, or 0.14 wt % or less, or 0.13 wt % or less, or 0.12 wt % or less, or 0.11 wt % or less, or 0.10 wt % or less, or 0.09 wt % or less, or 0.08 wt % or less, or 0.07 wt % or less, or 0.06 wt % or less, or 0.05 wt % or less, or 0.01 wt % or less of carbon black based on a total weight of the polymeric composition. In non-laser printable examples, the polymeric composition may comprise 1 wt % or greater, or 2 wt % or greater, or 3 wt % or greater, or 4 wt % or greater, or 5 wt % or greater of carbon black based on a total weight of the polymeric composition.

The carbon black may have an average particle size of between about 10 nm to about 300 nm, or from 10 nm to 100 nm, or from 15 nm to 50 nm as measured using laser diffraction spectroscopy. The carbon black may be added to the polymeric composition as a neat, or pure component, or may be added as part of a masterbatch combined with one or more other components.

Polymeric Ultraviolet Light Stabilizer

The polymeric composition may comprise the polymeric ultraviolet light stabilizer. The polymeric stabilizer comprises one or more hindered amine moieties. As used herein, a hindered amine moiety is an amine moiety present on an aromatic ring such that the lone pair of electrons of the nitrogen atom is conjugated into the aromatic ring. An example of a polymeric stabilizer comprising a hindered amine moiety has a CAS registration number of 136504-96-6 and is described as 1,3-propanediamine, N1,N1'-1,2-ethanediylbis-, polymer with 2,4,6-trichloro-1,3,5-triazine, reaction products with N-butyl-2,2,6,6-tetramethyl-4-piperidinamine. A commercial example of the polymeric stabilizer is sold under the tradename UVASORB™ HA10 from 3V Sigma USA, Georgetown, South Carolina, USA. The polymeric stabilizer has a weight average molecular weight of from 5,000 grams per mol ("g/mol") to 20,000 g/mol as measured according to Component GPC. For example, the polymeric stabilizer may have a weight average molecular weight of 5,000 g/mol or greater, or 6,000 g/mol or greater, or 7,000 g/mol or greater, or 8,000 g/mol or greater, or 9,000 g/mol or greater, or 10,000 g/mol or greater, or 11,000 g/mol or greater, or 12,000 g/mol or greater, or 13,000 g/mol or greater, or 14,000 g/mol or greater, or 15,000 g/mol or greater, or 16,000 g/mol or greater, or 17,000 g/mol or greater, or 18,000 g/mol or greater, or 19,000 g/mol or greater, while at the same time, 20,000 g/mol or less, or 19,000 g/mol or less, or 18,000 g/mol or less, or 17,000 g/mol or less, or 16,000 g/mol or less, or 15,000 g/mol or less, or 14,000 g/mol or less, or 13,000 g/mol or less, or 12,000 g/mol or less, or 11,000 g/mol or less, or 10,000 g/mol or less, or 9,000 g/mol or less, or 8,000 g/mol or less, or 7,000 g/mol or less, or 6,000 g/mol or less as measured according to Component GPC.

The polymeric composition may comprise the polymeric stabilizer in an amount from 0.25 wt % to 2.00 wt % based on a total weight of the polymeric composition. For example, the polymeric composition may comprise 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, while at the same time, 2.00 wt % or less, or 1.75 wt % or less, or 1.50 wt % or less, or 1.25 wt % or less, or 1.00 wt % or less, or 0.75 wt % or less, or 0.50 wt % or less of the polymeric stabilizer based on the total weight of the polymeric composition.

Oligomeric Ultraviolet Light Stabilizer

The polymeric composition may comprise the oligomeric ultraviolet light stabilizer. The oligomeric stabilizer may comprise one or more hindered amine moieties. An example of the oligomeric stabilizer has a CAS registration number of 136504-96-6 and is described as 1,3-propanediamine, N1,N1'-1,2-ethanediylbis-, polymer with 2,4,6-trichloro-1,3,5-triazine, reaction products with N-butyl-2,2,6,6-tetramethyl-4-piperidinamine. Such an oligomeric stabilizer is sold under the tradename UVASORB™ HA88 from 3V Sigma USA, Georgetown, South Carolina, USA. Another example of the oligomeric stabilizer has a CAS registration number 71878-19-8 and is described as poly[[6-[(1,1,3,3-tetramethylbutyl)amino]-1,3,5-triazine-2,4-diyl][(2,2,6,6-tetramethyl-4-piperidinyl)imino]-1,6 hexanediyl[(2,2,6,6-tetramethyl-4-piperidinyl)imino]]. Such an oligomeric stabilizer is sold under the tradename CHIMASSORB™ 944 LD from BASF, Ludwigshafen, Germany.

The oligomeric stabilizer has a weight average molecular weight of from 1,000 g/mol to 5,000 g/mol as measured according to Component GPC. For example, the oligomeric stabilizer may have a weight average molecular weight of 1,000 g/mol or greater, or 1,500 g/mol or greater, or 2,000 g/mol or greater, or 2,500 g/mol or greater, or 3,000 g/mol or greater, or 3,500 g/mol or greater, or 4,000 g/mol or greater, or 4,500 g/mol or greater, while at the same time, 5,000 g/mol or less, or 4,500 g/mol or less, or 4,000 g/mol or less, or 3,500 g/mol or less, or 3,000 g/mol or less, or 2,500 g/mol or less, or 2,000 g/mol or less, or 1,500 g/mol or less as measured according to Component GPC.

The polymeric composition may comprise the oligomeric stabilizer in an amount from 0.25 wt % to 2.00 wt % based on a total weight of the polymeric composition. For example, the polymeric composition may comprise 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, while at the same time, 2.00 wt % or less, or 1.75 wt % or less, or 1.50 wt % or less, or 1.25 wt % or less, or 1.00 wt % or less, or 0.75 wt % or less, or 0.50 wt % or less of the oligomeric stabilizer based on the total weight of the polymeric composition.

Resin

As stated above, both the copolymer and the ethylene-based polymer of the resin each comprise a comonomer. By tailoring the wt % of comonomer and on what molecular weight fraction of the resin the comonomer exists, the polymeric composition may meet or exceed the above-noted cyclic temperature shrinkback and tensile elongation at break mechanical properties. The portion of the resin at which the comonomer content should be tailored is the proportion of the resin with a weight average molecular weight of about $10^5$ g/mol to $10^{5.5}$ g/mol. The proportion of the resin with a weight average molecular weight of about $10^5$ g/mol to $10^{5.5}$ g/mol is defined herein as the "High Mw Weight Fraction" as explained in greater detail below in the GPC test method.

The polymeric composition may comprise a High Mw Weight Fraction of 0.02 or greater, or 0.04 or greater, or 0.06 or greater, or 0.08 or greater, or 0.10 or greater, or 0.12 or greater, or 0.14 or greater, or 0.16 or greater, or 0.18 or greater, or 0.20 or greater, or 0.22 or greater, or 0.24 or greater, or 0.26 or greater, or 0.28 or greater, while at the same time, 0.30 or less, or 0.28 or less, or 0.26 or less, or 0.24 or less, or 0.22 or less, or 0.20 or less, or 0.18 or less, or 0.16 or less, or 0.14 or less, or 0.12 or less, or 0.10 or less, or 0.08 or less, or 0.06 or less, or 0.04 or less, or 0.02 or less. The weight percent of the High Mw Weight Fraction of the combined copolymer and the ethylene-based polymer is calculated by multiplying the weight fraction value by 100.

The average comonomer content of the High Mw Weight Fraction ("High Mw Comonomer Content") is determined from the short-chain branching data acquired via Ethylene GPC, as described below in the Ethylene GPC test method. The polymeric composition may comprise a High Mw Comonomer Content of 3.2 wt % or greater, or 3.4 wt % or greater, or 3.6 wt % or greater, or 3.8 wt % or greater, or 4.0 wt % or greater, or 4.2 wt % or greater, or 4.4 wt % or greater, or 4.6 wt % or greater, or 4.8 wt % or greater, or 5.0 wt % or greater, or 5.2 wt % or greater, or 5.4 wt % or greater, or 5.6 wt % or greater, or 5.8 wt % or greater, while at the same time, 6.0 wt % or less, or 5.8 wt % or less, or 5.6 wt % or less, or 5.4 wt % or less, or 5.2 wt % or less, or 5.0 wt % or less, or 4.8 wt % or less, or 4.6 wt % or less, or 4.4 wt % or less, or 4.2 wt % or less, or 4.0 wt % or less, or 3.8 wt % or less, or 3.6 wt % or less, or 3.4 wt % or less.

The product of the High Mw Weight Fraction and High Mw Comonomer Content, defined as "Relevant Comonomer Content", thus represents the weight percent of the total mass of comonomer present in all chains of total size Log10 of Mw between 5.00 and 5.50, as compared to the total mass of the polymeric composition. The polymeric composition may comprise a Relevant Comonomer Content of 0.6 wt % or greater, or 0.8 wt % or greater, or 1.0 wt % or greater, or 1.2 wt % or greater, or 1.4 wt % or greater, or 1.6 wt % or greater, or 1.8 wt % or greater, or 2.0 wt % or greater, or 2.2 wt % or greater, or 2.4 wt % or greater, or 2.6 wt % or greater, or 2.8 wt % or greater, or 3.0 wt % or greater, or 3.2 wt % or greater. Put another way, the total comonomer contained within the portion having a molecular weight in the range of $10^5$ g/mol to $10^{5.5}$ g/mol as measured by Ethylene GPC is at least 0.6 wt % of the total weight of the polymeric composition.

Mechanical Properties

The polymeric composition may exhibit a retained tensile elongation at break after aging, as described in greater detail below, of greater than 75%. For example, the retained elongation at break of the polymeric composition may be 76% or greater, or 80% or greater, or 85% or greater, or 90% or greater, or 95% or greater, while at the same time, 100% or less, or 95% or less, or 90% or less, or 85% or less, or 80% or less.

The polymeric composition may exhibit a cyclic temperature shrinkback, as explained in greater detail below, of less than 2.50%. For example, the cyclic temperature shrinkback of the polymeric composition may be 2.45% or less, or 2.40% or less, or 2.35% or less, or 2.30% or less, or 2.25% or less, or 2.20% or less, or 2.15% or less, or 2.10% or less, or 2.05% or less, or 2.00% or less, or 1.95% or less, or 1.90% or less, or 1.85% or less, or 1.80% or less, or 1.75% or less, or 1.70% or less, or 1.65% or less, or 1.60% or less, or 1.55% or less, while at the same time, 1.50% or more, or 1.55% or more, or 1.60% or more, or 1.65% or more, or 1.70% or more, or 1.75% or more, or 1.80% or more, or 1.85% or more, or 1.90% or more, or 1.95% or more, or 2.00% or more, or 2.05% or more, or 2.10% or more, or 2.15% or more, or 2.20% or more, or 2.25% or more, or 2.30% or more, or 2.35% or more, or 2.40% or more.

The polymeric composition exhibits both an Unaged COF and an Aged COF. As used herein, the Unaged COF is the COF exhibited by the polymeric composition without any intentional ageing or delay of testing after its manufacture. As used therein, an Aged COF is the COF exhibited by the polymeric composition after having been held at a temperature of 55° C. for 336 hours (i.e., two weeks) and without any intentional delay or aging prior to the heating.

The Unaged COF of the polymeric composition may be 0.01 or greater, or 0.02 or greater, or 0.04 or greater, or 0.06 or greater, or 0.08 or greater, or 0.10 or greater, or 0.12 or greater, or 0.14 or greater, or 0.16 or greater, or 0.18 or greater, while at the same time, 0.20 or less, or 0.18 or less, or 0.16 or less, or 0.14 or less, or 0.12 or less, or 0.10 or less, or 0.08 or less, or 0.06 or less, or 0.04 or less, or 0.02 or less as measured according to ASTM D1894.

The Aged COF of the polymeric composition may be 0.01 or greater, or 0.02 or greater, or 0.04 or greater, or 0.06 or greater, or 0.08 or greater, or 0.10 or greater, or 0.12 or greater, or 0.14 or greater, or 0.16 or greater, or 0.18 or greater, while at the same time, 0.20 or less, or 0.18 or less, or 0.16 or less, or 0.14 or less, or 0.12 or less, or 0.10 or less, or 0.08 or less, or 0.06 or less, or 0.04 or less, or 0.02 or less as measured according to ASTM D1894.

Additives

The polymeric composition may comprise additional additives in the form of antioxidants, processing aids, coupling agents, antistatic agents, additional nucleating agents, slip agents, lubricants, viscosity control agents, tackifiers, anti-blocking agents, surfactants, extender oils, acid scavengers, flame retardants and metal deactivators. The polymeric composition may comprise from 0.01 wt % to 5 wt % of one or more of the additional additives. The additives may be added individually as neat components, may be combined and/or may be added in one or more masterbatches.

The polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. The filler(s) can have a median size or d50 of less than 20 µm, less than 10 µm, or less than 5 µm. The fillers may be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, and graphite. Fillers may be included in the polymeric composition in an amount ranging from 2 to 30 wt %, or from 5 to 30 wt % based on the total weight of the polymeric composition.

The processing aids may comprise metal salts of fluororesin such as polytetrafluoroethylene or fluorinated ethylene propylene; carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

The antioxidants may comprise hindered phenols such as tetrakis[methylene(3,5-di-tert-butyl-4-hydroxyhydro-cinnamate)]methane; bis[(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydro-cinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-di-methylbenzyl)diphenylamine, diphenyl-p-phenylenediamine, mixed di-aryl-p-phenylenediamines, and other hindered amine anti-degradants or stabilizers.

Compounding and Coated Conductor Formation

The components of the polymeric composition can be added to a batch or continuous mixer for melt blending to form a melt-blended composition. The components can be added in any order or first preparing one or more masterbatches for blending with the other components. The melt blending may be conducted at a temperature above the melting point of the highest melting polymer. The melt-blended composition is then delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Examples of compounding equipment used include internal batch mixers, such as a BANBURY™ or BOLLING™ internal mixer. Alternatively, continuous single, or twin screw, mixers can be used, such as FARRELL™ continuous mixer, a WERNER™ and PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

A coated conductor may be made from the polymeric composition. The coated conductor includes a conductor and a coating. The coating including the polymeric composition. The polymeric composition is at least partially disposed around the conductor to produce the coated conductor. The conductor may comprise a conductive metal or an optically transparent structure.

The process for producing a coated conductor includes mixing and heating the polymeric composition to at least the melting temperature of the polymeric components in an extruder to form a polymeric melt blend, and then coating the polymeric melt blend onto the conductor. The term "onto" includes direct contact or indirect contact between the polymeric melt blend and the conductor. The polymeric melt blend is in an extrudable state.

The polymeric composition is disposed on and/or around the conductor to form a coating. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the conductor. The coating may directly contact the conductor. The coating may directly contact an insulation layer surrounding the conductor.

EXAMPLES

Materials

The following materials are employed in the Examples, below.

Copolymer is an ethylene-hexene copolymer having a density of 0.955 g/cc, a melt index ($I_2$) of 1.5 g/10 min., and a melt index ($I_{21}$) 106 g/10 min. and is available from The Dow Chemical Company, Midland, MI.

EP1 is a UNIPOL™ gas phase unimodal ethylene-butene polymer having a density of 0.920 g/cc, a melt index ($I_2$) of 0.56 g/10 min., and a melt index ($I_{21}$) 56 g/10 min.

Si Gum is a blend 35 wt % polydimethylsiloxane that is dimethylvinylsiloxy-terminated and has a Mw of 696,000 g/mol as measured according to Component GPC with the balance being a medium density polyethylene having a density of 0.935 g/cc and a melt flow rate of 0.65 g per 10 minutes at 190° C. The PDMS of the Si Gum is available from the Dow Chemical Company, Midland, MI.

CBMB is a carbon black masterbatch comprising 45 wt % carbon black and is available from The Dow Chemical Company, Midland, MI.

HA10 is a polymeric ultraviolet light stabilizer having a CAS registration number of 136504-96-6 and a weight average molecular weight of approximately 10,000 as measured according to Component GPC. HA10 is commercially available under the tradename UVASORB™ HA10 from 3V Sigma USA, Georgetown, South Carolina, USA.

HA88 is an oligomeric ultraviolet light stabilizer having a CAS registration number of 136504-96-6 and a weight average molecular weight of approximately 3,000 as measured according to Component GPC. HA88 is commercially available under the tradename UVASORB™ HA88 from 3V Sigma USA, Georgetown, South Carolina, USA.

PEG is polyethylene glycol having a weight average molecular weight of 20,000 g/mol and is available from Clariant, Germany.

AO1 is a sterically hindered phenolic antioxidant having the chemical name pentaerythritol tetrakis(3-(3,5-di-tert-butyl-4-hydroxyphenyl)propionate), that is commercially available as IRGANOX 1010™ from BASF, Ludwigshafen, Germany.

AO2 is a hydrolytically stable phosphite processing stabilizer having the chemical name tris(2,4-ditert-butylphenyl)phosphite, that is commercially available as IRGAFOS® 168 from BASF, Ludwigshafen, Germany.

PA is a fluororesin processing aid commercially available under the tradename DYNAMAR™ FX 5912 available from 3M, Saint Paul, Minnesota, USA.

Sample Preparation

Inventive examples ("IE") 1-3 and comparative example ("CE") 1 were compounded on a mini-BANBURY (1.2 kg) or BANBURY (12 kg) batch mixer from HF Mixing Group. The drop temperature was 150° C. After compounding, the samples were extruded and pelletized.

The pelletized samples were formed into plaques and jackets for different mechanical tests. Plaques were prepared by compression molding pellets on a pre-heated Arbor press at 180° C. The pellets were placed into molds of different thickness per testing requirements. The samples were heated to 180° C. for 4 minutes, then pressed for 3 minutes at 3.45 mega pascals (MPa) followed by 3 minutes at 17.24 MPa. Samples were cooled in the press at 15° C./minute to 23° C. and then removed. Jacket samples were prepared via extrusion of the polymeric composition onto a conductor using a 6.35 cm wire extrusion line from Davis-Standard at 91 meters per minute with a 0.05 cm wall thickness at 180° C.-240° C.

Heat aging of the samples for tensile elongation at break was conducted by preheating a Type I oven (according to ASTM D5423) to 100° C. Samples were then loaded into the pre-heated oven and aged for 10 days. After aging, the samples were then conditioned at 23° C. at 50% relative humidity for 24 hours.

Compression molded plaques (1.27 mm×101.6 mm×101.6 mm) of the test samples were prepared and laser marked according to the parameters of Table 1.

TABLE 1

| Laser Model | YLP-1/100/20/20-HC λ1064.6 nm |
|---|---|
| Beam Diameter | 7.794 mm |
| Beam Delivery | SCANLab HurrySCAN 11/14 |
| Focus Lens | Linos 245 mm F-Theta-Ronar |
| Controller | Lanmark Controls Maestro 3000 (LEC-1) IPG Laser ext. board |
| Software | Lanmark Controls WinLase LAN 5 v.5.1.11.14 |
| Pulse Energy | 1 mJ |
| Marking Speed | 2000 mm/s |

Test Methods

Triple Detector Gel Permeation Chromatography ("Ethylene GPC") was performed using a chromatographic system. The chromatographic system consisted of a PolymerChar GPC-IR (Valencia, Spain) high temperature GPC chromatograph equipped with an internal IR5 infra-red detector (IR5) and 4-capillary viscometer (DV) coupled to a Agilent Technologies 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration and calculation of the conventional molecular weight moments and the distribution (using the 20 um "Mixed A" columns) were performed according to the method described in the Conventional GPC procedure.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software. As used herein, "MW" refers to molecular weight.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity (IV). The chromatographic concentrations are assumed low enough to eliminate addressing 2nd viral coefficient effects.

The absolute weight average molecular weight (Mw (Abs)) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are extrapolated at chromatographic ends where signal to noise becomes low (using GPCOne™). Other respective moments, $Mn_{(Abs)}$ and $Mz_{(Abs)}$ are be calculated according to equations 1-2 as follows:

$$Mn(\text{Abs}) = \frac{\sum_i IR_i}{\sum_i (IR_i / M_{Absolute\ i})} \quad (\text{EQ 1})$$

$$Mz(\text{Abs}) = \frac{\sum_i (IR_i * M_{Absolute\ i}^2)}{\sum_i (IR_i / M_{Absolute\ i})} \quad (\text{EQ 2})$$

Conventional GPC: The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$MW_{polyethylene} = A \times (Mw_{polystyrene})^B \quad (EQ3)$$

where MW is the molecular weight, A has a value of 0.4315 and B is equal to 1.0.

A fifth order polynomial was used to fit the respective polyethylene-equivalent calibration points. A small adjustment to A (from approximately 0.395 to 0.440) was made to correct for column resolution and band-broadening effects such that of a linear homopolymer polyethylene standard is obtained at 120,000 g/mol Mw.

The total plate count of the GPC column set was performed with decane (prepared at 0.04 g in 50 milliliters of TCB.) The plate count (Equation 4) and symmetry (Equation 5) were measured on a 200 microliter injection according to the following equations:

$$\text{Plate Count} = 5.54 * \left( \frac{RV_{Peak\,Max}}{\text{Peak Width at } \frac{1}{2} \text{ height}} \right)^2 \quad (EQ4)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,Max})}{(RV_{Peak\,Max} - \text{Front Peak } RV_{one\,tenth\,height})} \quad (EQ5)$$

where RV is the retention volume in milliliters and the peak width is in milliliters, Peak max is the maximum position of the peak, one tenth height is ⅒ height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be from 0.98 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn(conv), Mw(conv), and Mz(conv) were based on GPC results using the internal IR5 detector (measurement channel) of the PolymerChar GPC-IR chromatograph according to Equations 6-8, using PolymerChar GPCOne™ software, the baseline-subtracted IR chromatogram at each equally-spaced data collection point (i), and the polyethylene equivalent molecular weight obtained from the narrow standard calibration curve for the point (i) from EQ 1.

$$Mn(conv) = \frac{\Sigma^i IR_i}{\Sigma^i (IR_i / M_{polyethylene_i})} \quad (EQ\,6)$$

$$Mw(conv) = \frac{\Sigma^i (IR_i * M_{polyethylene_i})}{\Sigma^i IR_i} \quad (EQ\,7)$$

$$Mz(conv) = \frac{\Sigma^i (IR_i * M_{polyethylene_i}^2)}{\Sigma^i (IR_i * M_{polyethylene_i})} \quad (EQ\,8)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 9. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate(nominal)} * (RV(FM\,Calibrated)/RV(FM\,Sample)) \quad (EQ9)$$

A calibration for the IR5 detector rationing was performed using at least ten ethylene-based polymer standards (polyethylene homopolymer and ethylene/octene copolymers) of known short chain branching (SCB) frequency (as measured by $^{13}C$ NMR), ranging from homopolymer (0 SCB/1000 total C) to approximately 40 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above.

The "IR5 Area Ratio (or "IR5$_{Methyl\ Channel\ Area}$/ IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of Equation 10:

$$SCB/1000\ total\ C = A_0 + [A_1 \times (IR5_{Methyl\ Channel\ Area}/IR5_{Measurement\ Channel\ Area})] \quad (EQ10)$$

In Equation 10, $A_0$ is the "SCB/1000 total C" intercept at an "IR5 Area Ratio" of zero, and $A_1$ is the slope of the "SCB/1000 total C" versus "IR5 Area Ratio" and represents the increase in the SCB/1000 total C as a function of "IR5 Area Ratio."

"A series of linear baseline-subtracted chromatographic heights" for the chromatogram generated by the "IR5 methyl channel sensor" was established as a function of column elution volume, to generate a baseline-corrected chromatogram (methyl channel). "A series of linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer as follows in Equation 11:

$$\text{mol \% comonomer} = \frac{SCB_f}{\left(SCB_f + \left(1000 - SCB_f * \frac{\text{comonomer length}}{2}\right)\right)} \quad (EQ11)$$

In Equation 11, "$SCB_f$" is the "SCB per 1000 total C", and the "comonomer length"=8.

The mol % comonomer is then converted to wt % comonomer by using the molecular weights of octene and ethylene.

Via the above method, a wt % comonomer can be calculated for a sample or for any portion of a sample. The use of this technique in combination with the conventional GPC analysis allows for wt % comonomer to be determined as a function of molecular weight ($C8_i$).

The High Mw Weight Fraction is determined from the conventional GPC method described above. The High Mw Weight Fraction is the total mass fraction measured to possess a Log10 of Mw at least 5.00 and less than 5.50, based on conventional GPC, as shown in Equation 12.

$$\text{High } Mw \text{ Weight Fraction} = \frac{\sum^{i[5 \le \log(M_{polyethylene_i}) < 5.5}} IR_i}{\sum^i IR_i} \quad (EQ12)$$

The High Mw Comonomer Content was calculated by using the weighted average comonomer wt % reported over the range of these molecular weights, as shown in Equation 13.

$$\text{High } Mw \text{ Comonomer Content} = \frac{\sum^{i[5 \le \log(M_{polyethylene_i}) < 5.5}} IR_i * C8_i}{\text{High } Mw \text{ Weight Fraction}} \quad (EQ13)$$

The product of the High Mw Weight Fraction with the High Mw Comonomer Content is the weight fraction of the resin consisting of comonomer included within polymer chains of the specified molecular weight. This product is the Relevant Comonomer.

The weight average molecular of the polydimethylsiloxane, the polymeric light stabilizer, the oligomeric light stabilizer, and the polyethylene glycol is measured by "Component GPC" according to the following parameters. Component GPC is performed using a Viscotek™ GPC Max using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade for the PDMS. The mobile phase may be different for measurement of the polymeric light stabilizer, the oligomeric light stabilizer, and the polyethylene glycol. The columns are two PL Gel Mixed C from Varian—(7.5*300 mm, 5 µm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™). The detectors are calibrated by injection of a narrow polystyrene standard (Mw 68,100 g/mol) of a known concentration. It will be understood that the PDMS, the polymeric light stabilizer, the oligomeric light stabilizer, and the polyethylene glycol may have their molecular weights reported by a supplier of that material and that such a reported molecular weight may be utilized in lieu of the Component GPC measurement.

Elongation at break was measured at 25 mm/min. with an extensometer according to IEC 60811-501 on dog bones cut from plaque samples.

Density was measured according to ASTM D792 at 23° C.

Melt indexes were measured per ASTM D1238 at 190° C. with either a 2.16 kg ($I_2$) load or a 21.6 kg load ($I_{21}$) as specified.

Cyclic temperature shrinkback testing was performed on jacket samples. Cyclic temperature shrinkback was conducted by conditioning the jacket sample in an oven at a ramp rate of 0.5° C./min. from 40° C. to 100° C. The sample was held at 100° C. for 60 minutes and then the temperature was ramped back down to 40° C. at a rate of 0.5° C./min. The jacket was held at 40° C. for 20 minutes and the temperature cycle was then repeated four more times for a total of five cycles. Shrinkage is reported as a percent change in length of the jacket from prior to testing to after testing and was measured using a ruler precise to 1.6 mm on 61 cm long specimens.

Percent grey contrast was calculated using ImageJ software (NIH) on a marking generated at a beam wavelength of 1064.6 nm, a frequency of 60 kHz, an intensity of 90% and a marking speed of 2000 mm/s.

Results

Table 1 provides the compositional data of IE1-IE3 and CE1. Table 2 provides the mechanical testing results of IE1-IE3 and CE1. Tensile elongation at break is provided for both unaged ("Unaged TE") and heat aged samples ("Aged TE"). The retained elongation at break after aging ("Retained TE") is calculated by dividing the Aged TE value by the TE value of a sample.

TABLE 1

| Component | CE1 | IE1 | IE2 | IE3 |
|---|---|---|---|---|
| Copolymer | 65.15 | 68.17 | 61.15 | 64.18 |
| EP1 | 27.9 | 29.22 | 26.20 | 27.51 |
| Si Gum | 0 | 0 | 5.7 | 5.7 |
| CBMB | 5.67 | 0.33 | 5.67 | 0.33 |
| HA10 | 0 | 0.25 | 0 | 0.25 |
| HA88 | 0 | 0.75 | 0 | 0.75 |
| PEG | 0.90 | 0.90 | 0.90 | 0.90 |
| AO1 | 0.18 | 0.18 | 0.18 | 0.18 |
| AO2 | 0.18 | 0.18 | 0.18 | 0.18 |
| PA | 0.02 | 0.02 | 0.02 | 0.02 |
| Total (wt %) | 100 | 100 | 100 | 100 |

TABLE 2

| Property | CE1 | IE1 | IE2 | IE3 |
|---|---|---|---|---|
| High Mw Comonomer Content (wt %) | 5.18 | 5.18 | 5.18 | 5.18 |
| High Mw Weight Fraction | 0.179 | 0.179 | 0.179 | 0.179 |
| Relevant Comonomer (wt %) | 0.92 | 0.92 | 0.92 | 0.92 |
| Unaged TE (%) | 1030 | 1115 | 1050 | 1079 |
| Aged TE (%) | 987 | 914 | 893 | 839 |
| Retained TE (%) | 96 | 82 | 85 | 78 |
| Cyclic temperature shrinkback (%) | 2.22 | 2.29 | 2.22 | 2.22 |
| Unaged COF | 0.21 | 0.24 | 0.07 | 0.08 |
| Aged COF | 0.24 | 0.23 | 0.08 | 0.07 |
| % Grey Contrast | 1 | 46 | 3 | 46 |

Referring now to Table 1 and Table 2, CE1 is able to meet the desired retained tensile elongation values, but fails to achieve an unaged COF of 0.20 or less. CE1 would also not be laser printable based on the amount of carbon black needed to ensure weathering resistance. IE1-IE3 are able to exhibit a cyclic temperature shrinkback of 2.5% or less, exhibit a retained tensile elongation at break of 75% or greater after heat aging, and one or both of an unaged COF of 0.20 or less and a grey contrast of 25% or greater. As can be seen, the addition of a polydimethylsiloxane having a weight average molecular weight of 550,000 g/mol to 650,000 g/mol in IE2 and IE3 is able to produce samples having a drastically lowered unaged and aged coefficient of friction while maintaining the cyclic temperature shrinkback of 2.5% or less and the tensile elongation at break of 75% or greater after heat aging. IE1 and IE3 demonstrate that removal of carbon black and replacement with polymeric ultraviolet light stabilizer comprising a hindered amine moiety and having a weight average molecular weight from 5,000 g/mol to 20,000 g/mol is able to produce samples that are laser printable (i.e., having a grey contrast of 25% or greater) while maintaining the cyclic temperature shrinkback of 2.5% or less and the tensile elongation at break of 75% or greater after heat aging. IE3 demonstrates that samples can be produced that meet all the physical properties described above when the polymeric composition comprises the copolymer, has a Relevant Comonomer Content of 0.6 wt % or greater and has both a polydimethylsiloxane having a weight average molecular weight of 550,000 g/mol to 650,000 g/mol and a polymeric ultraviolet light stabilizer comprising a hindered amine moiety and having a weight average molecular weight from 5,000 g/mol to 20,000 g/mol.

What is claimed is:

1. A polymeric composition, comprising:
   a resin comprising an ethylene-based polymer and a copolymer of ethylene and an alpha olefin comonomer, wherein the resin has a High Mw Comonomer Content of 3.2 wt % or greater based on a total weight of the resin over the weight average molecular weight range of $10^5$ g/mol to $10^{5.5}$ g/mol as measured by Ethylene GPC, and wherein the polymeric composition has a Relevant Comonomer Content of 0.6 wt % or greater; and
   at least one of (i) a polydimethylsiloxane having a weight average molecular weight of 550,000 g/mol to 650,000 g/mol as measured according to Component GPC and (ii) a polymeric ultraviolet light stabilizer comprising a hindered amine moiety and having a weight average molecular weight from 5,000 g/mol to 20,000 g/mol as measured according to Component GPC.

2. The polymeric composition of claim 1, wherein the polymeric composition comprises both (i) and (ii).

3. The polymeric composition of claim 1 wherein the polymeric composition comprises from 0.25 wt % to 2 wt % of the polymeric ultraviolet light stabilizer based on a total weight of the polymeric composition.

4. The polymeric composition of claim 3, comprising:
   0.10 wt % to 0.25 wt % of carbon black based on a total weight of the polymeric composition.

5. The polymeric composition of claim 4, wherein the polymeric ultraviolet light stabilizer has a weight average molecular weight from 8,000 g/mol to 12,000 g/mol as measured according to Component GPC, and wherein the polymeric ultraviolet light stabilizer has a chemical abstract services registration number of 136504-96-6.

6. The polymeric composition of claim 1, wherein the polymeric composition comprises from 35 wt % to 85 wt % of the copolymer based on the total weight of the polymeric composition.

7. The polymeric composition of claim 1, wherein the polymeric composition comprises from greater than 0 wt % to 10 wt % of the polydimethylsiloxane based on the total weight of the polymeric composition.

8. The polymeric composition of claim 1, wherein the resin has a High Mw Comonomer Content of 12.0 wt % or less over the molecular weight range of $10^5$ g/mol to $10^{5.5}$ g/mol as measured by Ethylene GPC.

9. The polymeric composition of claim 8, wherein 30 wt % or less of the total weight of the resin has a molecular weight in the range of $10^5$ g/mol to $10^{5.5}$ g/mol as measured by Ethylene GPC.

10. A coated conductor comprising:
    a conductor; and
    the polymeric composition of claim 1 disposed at least partially around the conductor.

* * * * *